(12) United States Patent
Kelly et al.

(10) Patent No.: US 7,171,785 B1
(45) Date of Patent: Feb. 6, 2007

(54) TWO PIECE OUTER BELT WEATHERSTRIP

(75) Inventors: Walter J. Kelly, Howell, MI (US); Anthony W. Loe, Grass Lake, MI (US); Christopher L. Kesh, West Bloomfield, MI (US)

(73) Assignee: GenCorp, Inc., Sacramento, CA (US)

( * ) Notice: Subject to any disclaimer, the term of this patent is extended or adjusted under 35 U.S.C. 154(b) by 374 days.

(21) Appl. No.: 09/717,767

(22) Filed: Nov. 21, 2000
(Under 37 CFR 1.47)

(51) Int. Cl.
*B60J 1/16* (2006.01)
(52) U.S. Cl. ............................................ 49/377
(58) Field of Classification Search ............ 49/374, 49/377, 475, 1
See application file for complete search history.

(56) References Cited

U.S. PATENT DOCUMENTS

| 3,638,359 | A |  | 2/1972  | Kruschwitz |
|-----------|---|--|---------|------------|
| 3,665,646 | A |  | 5/1972  | Niemanns |
| 3,742,649 | A |  | 7/1973  | Dochnahl |
| 4,696,128 | A |  | 9/1987  | Fukuhara |
| 4,843,763 | A |  | 7/1989  | Mesnel |
| 4,949,507 | A |  | 8/1990  | Vaughan |
| 5,001,867 | A |  | 3/1991  | Dupuy |
| 5,040,333 | A |  | 8/1991  | Mesnel et al. |
| 5,048,887 | A |  | 9/1991  | Kunishima et al. |
| 5,067,281 | A |  | 11/1991 | Dupuy |
| 5,085,005 | A |  | 2/1992  | Yasukawa et al. |
| 5,086,589 | A |  | 2/1992  | dibenedetto |
| 5,174,066 | A |  | 12/1992 | Dupuy |
| 5,199,760 | A | * | 4/1993  | Vering ................ 296/146.16 |
| 5,353,549 | A |  | 10/1994 | Henderson et al. |
| 5,433,038 | A |  | 7/1995  | Dupuy |
| 5,493,815 | A |  | 2/1996  | Belser et al. |
| 5,544,448 | A |  | 8/1996  | Mass |
| 5,561,003 | A |  | 10/1996 | Nowosiadly |
| 5,870,860 | A | * | 2/1999  | Heller ..................... 49/477.1 |
| 6,070,363 | A |  | 6/2000  | Vance |
| 6,128,859 | A |  | 10/2000 | Vance |
| 6,282,840 | B1 | * | 9/2001 | Vance ..................... 49/377 |
| 6,409,251 | B1 | * | 6/2002 | Kaye et al. ............. 296/146.9 |

FOREIGN PATENT DOCUMENTS

EP      0 507 231 A2    10/1992

* cited by examiner

*Primary Examiner*—Jerry Redman
(74) *Attorney, Agent, or Firm*—Brinks Hofer Gilson & Lione

(57) ABSTRACT

A two piece outer belt weatherstrip provides a seal between the upper portion of a door and the lower portion a window. The weatherstrip comprises two individual components: a cover and a body. The cover is generally T-shaped and includes a curved outer surface that is visible when assembled and installed and a centrally disposed web. The body is a complex generally S-shaped member having adjacent parallel slots opening in opposite directions. One slot receives the web of the cover and the other receives a vertical flange of the vehicle door and secures the weatherstrip thereon. An S-shaped metal reinforcing member resides with the body and a pair of wiper flanges extending from one face of the body engage the window glass and seal thereagainst. These components are preferably extruded but may be molded depending, inter alia, upon the configurations of their terminal portions.

18 Claims, 4 Drawing Sheets

TWO PIECE OUTER BELT WEATHERSTRIP

BACKGROUND OF THE INVENTION

The invention relates generally to a weatherstrip for a motor vehicle and more specifically to a two piece outer belt weatherstrip for disposition between the window and door of a motor vehicle.

Most motor vehicles are equipped with movable window glass that slides in a window opening from an up or extended position that seals off the opening to a down position, retracted within the vehicle body, that opens all or a portion of the window opening and allows an exchange of air between the inside and outside of the vehicle. A sealing device generically referred to as a weatherstrip is disposed about the periphery of the window opening and provides an air and watertight seal between the vehicle body and the window glass. The interface between the body and the movable window glass at the lower margin of the window opening is typically equipped with a weatherstrip denominated a beltstrip which aesthetically hides the interface and provides at least one wiper flange or blade for cleaning the window as the window extends from and retracts into the body of the vehicle.

Design and engineering effort directed to vehicle streamlining for drag reduction and reduction of wind noise is ongoing. To achieve these goals, design considerations such as the elimination of all gaps and channels, low profile configurations, overlapping of the beltstrip or weatherstrip on the glass, as well as installation ease, serviceability and durability have received significant attention. The challenge of achieving such goals depends upon the proper execution of such design considerations.

Beltstrips and weatherstrips are generally extruded or roll-formed in a complicated manufacturing process having many steps. Typically, a core metal structure is formed and coated with an adhesive to bond a subsequently extruded layer of synthetic elastomeric material to the metal to form a belt molding which is then cut to length. A sealing strip having a flexible blade for contacting the window may be formed and coated in an extrusion process utilizing rubber or a similar material. An inner surface of the blade is generally flocked to provide a low friction coating exhibiting reduced sliding friction between the blade and the window glass and to reduce the tendency of the weatherstrip and window glass to squeak. The sealing strip is typically affixed to the belt molding. The belt molding and the sealing strip are notched at spaced locations. Clips are then inserted into the notches to couple the belt molding and the sealing strip. The clips also grip a flange formed on the door of the vehicle to hold the weatherstrip to the door.

The materials used to form the weatherstrip are typically a combination of thermoset elastomer or thermoset and thermoplastic elastomer. For example, an elastomer may be extruded over a metal carrier and then a post assembled laminate strip of cosmetic film and metal that is roll formed into a C-configuration is mechanically fastened over a section of the front surface of the belt weatherstrip.

The requirement of cosmetic surfaces dictates that the surface area be made of a specific thermoplastic, a decorative film or consist of a painted metal while providing a seal to prevent air and water leakage. Conventional weatherstrips lack the flexibility to interchange the front surface in order to provide a different cosmetic appearance.

SUMMARY OF THE INVENTION

A two piece outer belt weatherstrip provides a seal between the upper portion of a door and the lower portion a window. The weatherstrip comprises two individual components: a cover and a body. The cover is generally T-shaped and includes a curved outer surface which is visible when assembled and installed and a centrally disposed web. The body is a complex generally S-shaped member having adjacent parallel slots opening in opposite directions. One slot receives the web of the cover and the other receives a vertical flange of the vehicle door and secures the weatherstrip thereon. An S-shaped metal reinforcing member resides with the body and a pair of wiper flanges extending from one face of the body engage the window glass and seal thereagainst. These components are preferably extruded but may be molded depending, inter alia, upon the configurations of their terminal portions. For example, the ends or terminal portions may simply be cut in a straight line or in any desired curve to match the adjacent body region or they may include molded end caps having both a desired cross section distinct from the weatherstrip and appropriately shaped or contoured end portions.

Both of the components may be fabricated of a wide variety of flexible plastic or elastomeric materials. Because each of the components is separate, they can be manufactured of different materials and of different colors to provide specifically desired properties. In addition to different materials and colors, the weatherstrip may be decorated by painting or chromating the surface based upon the specific type of material used. The weatherstrip is formed by inserting the web of the cover into the complementary web receiving slot of the body. The weatherstrip thus allows versatility of the selection of the separate components to meet the individual style and functional needs of a particular motor vehicle design.

It is thus an object of the present invention to provide a mechanically assembled weatherstrip comprising separate components.

It is another object of the present invention to provide a beltstrip or weatherstrip made by assembling two separate components.

It is a further object of the present invention to provide a beltstrip or weatherstrip having two components which may be made of two distinct materials and thus exhibit distinct properties such as color, gloss and resilience.

It is a still further object of the present invention to provide a beltstrip or weatherstrip having ends which are either cut or include molded end caps.

These and other aspects and advantages of the invention are described or apparent from the following detailed description of the preferred embodiment and appended drawings wherein like reference numbers refer to the same element, feature or component.

DESCRIPTION OF THE PREFERRED EMBODIMENT

Figure 1:
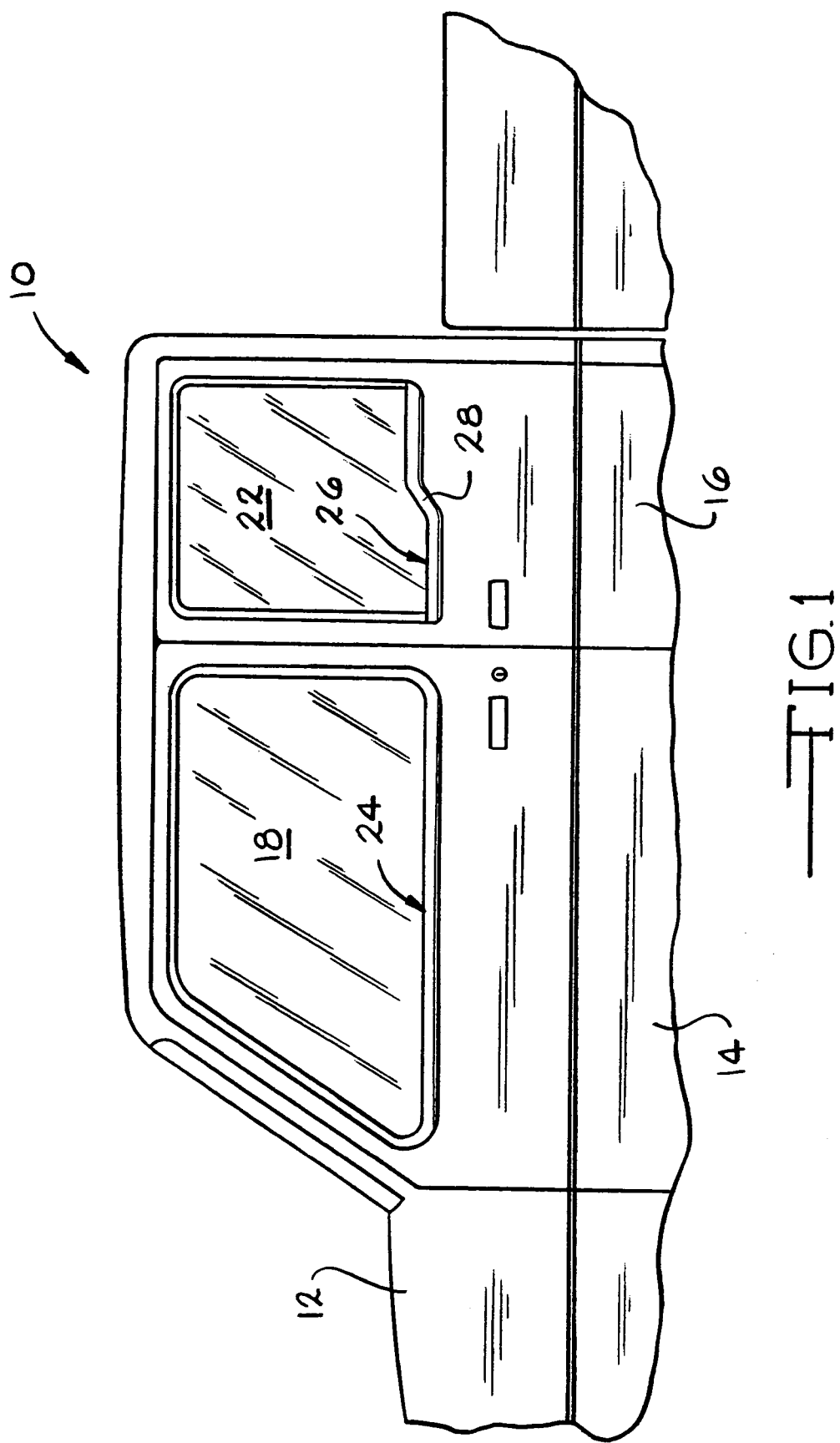
FIG. 1 is a partial, side elevational view of a motor vehicle incorporating the present invention.

Turning now to FIG. 1, a partial, side elevational view of a four-door motor vehicle such as a pickup truck, sport utility vehicle (SUV) or hybrid sport utility vehicle is illustrated and designated by the reference number 10. Such illustration is exemplary only and it will be appreciated that the present invention may also be utilized on passenger vehicles, truck cabs, tractor cabs and the like. The motor vehicle 10 includes a body 12, a front door 14, a rear door 16, a movable front window 18, a movable rear window 22, a front beltstrip or weatherstrip assembly 24 attached to the front door 14 at an interface with the front window 18 and a similar rear beltstrip or weatherstrip assembly 26 attached to the rear door 16 at an interface with the rear window 22. The weatherstrip assemblies 24 and 26 extend longitudinally along the lower edges of the front window 18 and the lower edge of the rear window 22, respectively, and function to aesthetically conceal the interface between the front door 14 and the lower margin of the front window 18 and the rear door 16 and the lower margin of the rear window 22, as well as to provide a seal to restrict air and water movement therebetween.

The rear weatherstrip assembly 26 may include an offset or hip 28 which conforms to the design of the rear door 16. But for the offset or hip 28 in the rear beltstrip or weatherstrip assembly 26 and the obvious, possible and likely differences of length and configurations of the ends, the front weatherstrip assembly 24 is identical to the rear window assembly 26.

Figure 2:
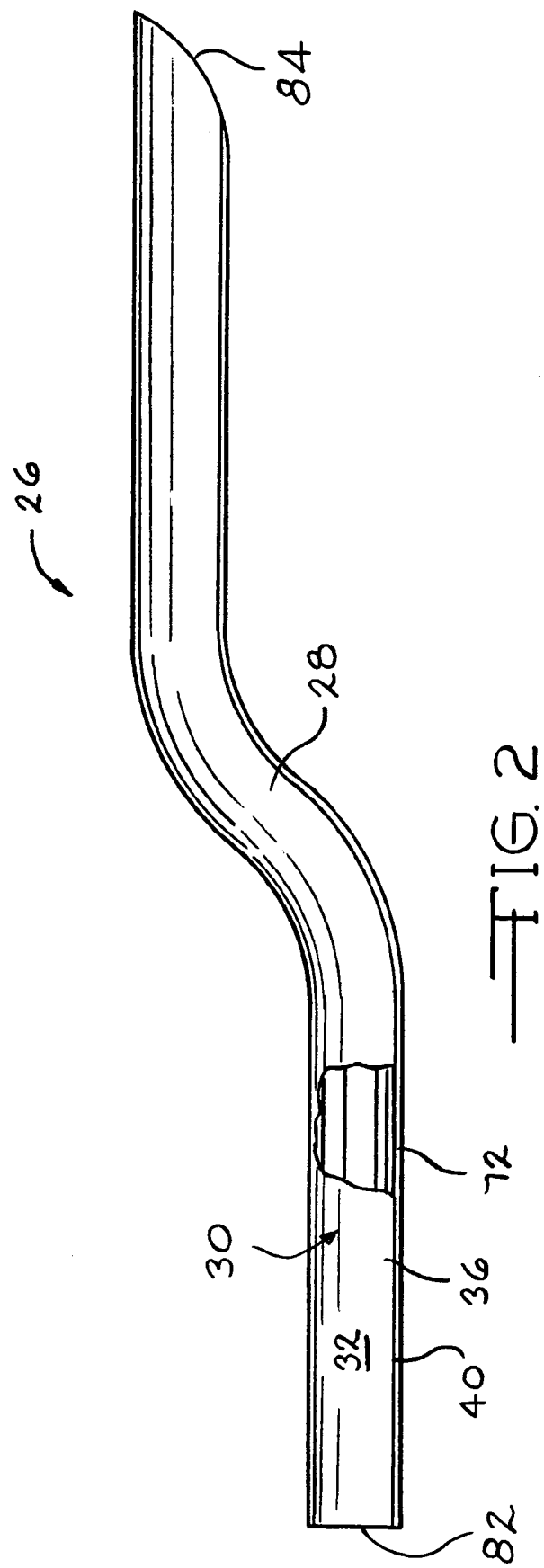
FIG. 2 is a side elevational view of a two piece outer belt weatherstrip according to the present invention.
Figure 3:
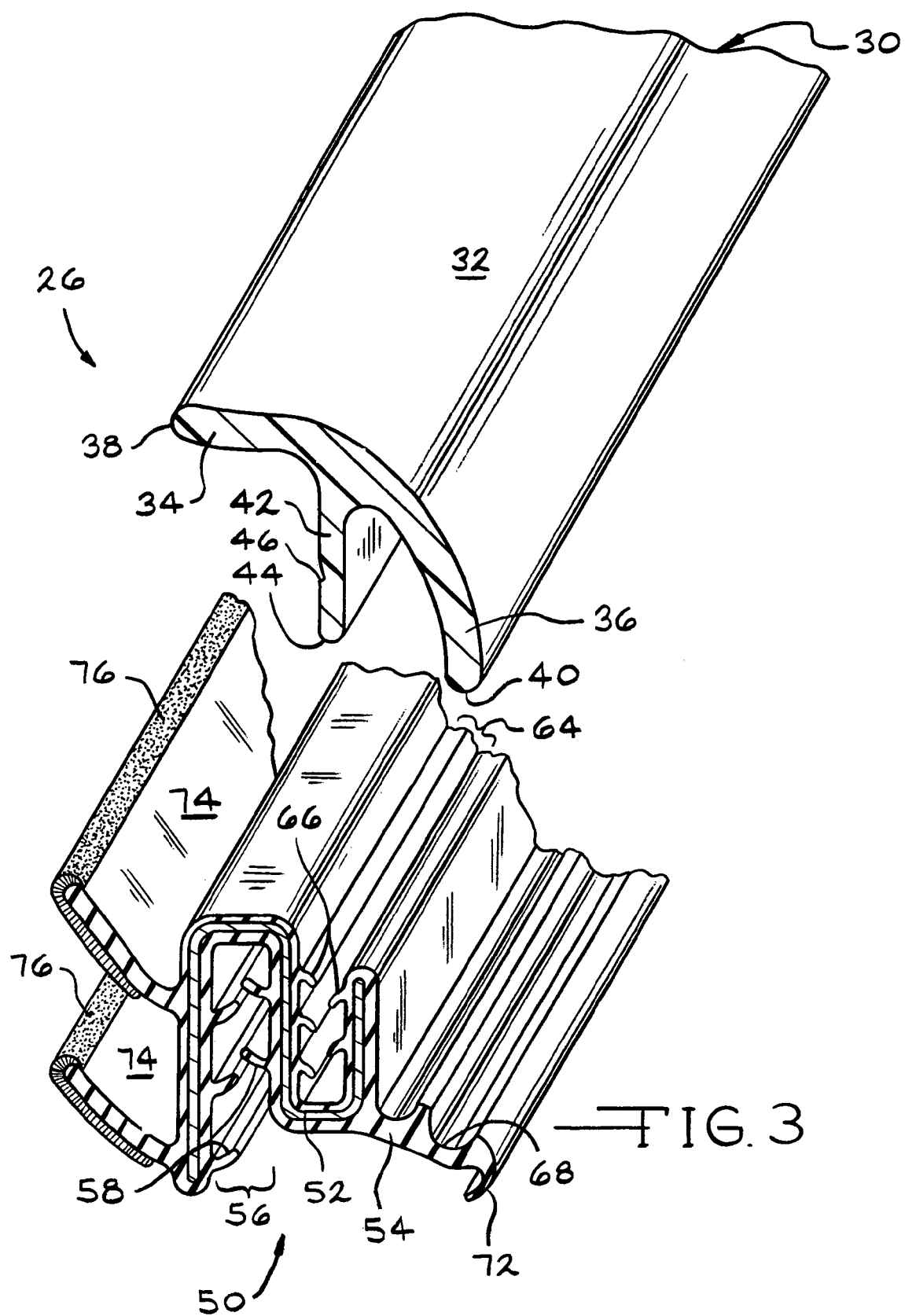
FIG. 3 is an exploded perspective view of a two piece outer belt weatherstrip according to the present invention.
Figure 4:
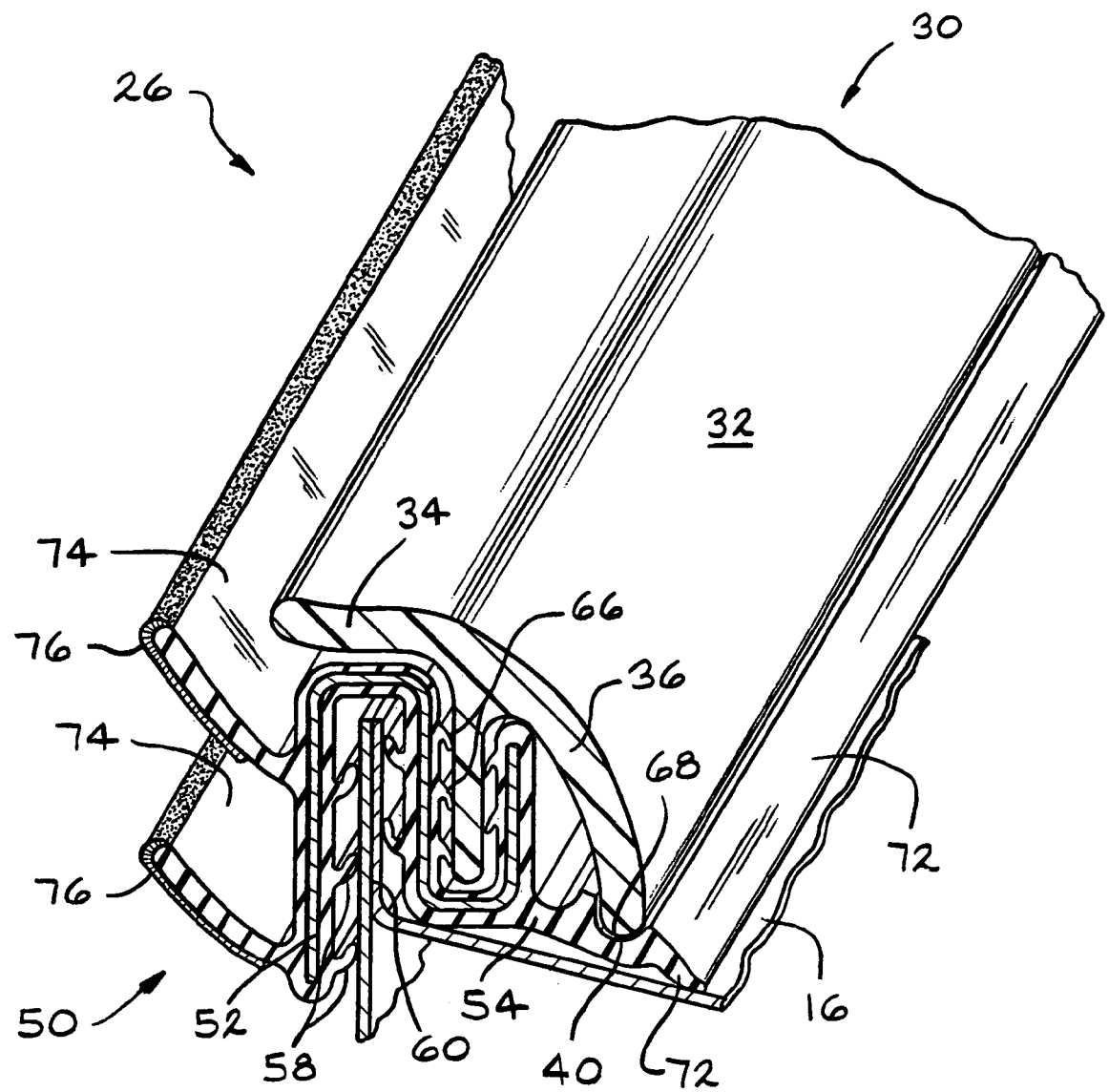
FIG. 4 is a perspective view of an assembled two piece outer belt weatherstrip according to the present invention.

Turning now to FIGS. 2, 3, and 4, the rear beltstrip or weatherstrip assembly 26 will be described. As noted previously, inasmuch as the front and rear weatherstrips 24 and 26 are identical, but for the differences described directly above, only the rear weatherstrip assembly 26 will be described, the description applying substantially, fully and completely to the front weatherstrip assembly 24.

As illustrated in FIGS. 3 and 4, the rear beltstrip assembly 26 includes a cover 30 having a curved or arcuate surface 32 defined by a generally horizontal first flange portion 34 and a generally oblique second flange portion 36. The first flange portion 34 defines a first radiused terminal portion 38 and the second flange portion 36 defines a similarly radiused second terminal portion 40. Extending from the cover 30 is a depending, generally centrally disposed web 42 having a radiused terminal portion 44. One or more asymmetrical notches 46 facilitates assembly and retention of the cover 30 into a body 50 as will be more fully described subsequently.

The cover 30 serves as an outer decorative component made from material which meets color, gloss and weatherability requirements of the individual motor vehicle manufacturer. The cover 30 may be made of a wide variety of materials and may be molded or extruded using processes well-known in the art.

In the preferred embodiment, the cover 30 is made preferably of a colored, weatherable grade, acrylic-styrene-acrylonitrile polycarbonate (ASA/PC) alloy. However, the cover 30 may also be made of combinations of nylon alloy materials, such as ASA, thermoplastic (TPO), polyacrylate polyvinyl chloride (PVC) and the like. Also, the cover 30 may be made of a film laminated thermoplastic material, such as acrylonitrile-butadiene-styrene (ABS), polyethylene teraphthalate (PET) and polybutylene teraphthalate (PBT) and the like. In addition, the cover 30 may be made of body matched painted thermoplastic material from any variety of thermoplastic families based on ABS, PET, PBT, polyamide (nylon) (PA) and the like.

The body 50 is a complex, generally S-shaped component having an S-shaped, metal internal reinforcing channel member 52 which provides strength, rigidity and dimensional stability to the body 50. In addition to the s-shaped metal reinforcing member 52 illustrated, it may also be one or more wires or a flexible metal carrier capable of conforming to the configuration of the doors 14 and 16 and any associated hip 28 or other feature. The reinforcing member 52 is fully surrounded by elastomeric material 54 defining a plurality of webs, flanges and other features. A first slot or throat 56 includes a plurality of inwardly directed, obliquely oriented, generally alternating ribs or ears 58 which engage a vertical flange 60 extending upwardly from the rear door 16 and secure the weatherstrip assembly 26 thereupon. A second parallel and adjacent throat or slot 64 also includes a plurality of inwardly directed, obliquely oriented, generally alternating ribs or ears 66. The second plurality of ribs or ears 66 engage and retain the web 42 of the cover 30 within the second slot 64. The asymmetrical notch 46 is preferably engaged by one of the second plurality of ribs or ears 66 which further assists retention of the cover 30 on the body 50. The elastomeric material 54 of the body 50 also defines a generally semi-circular channel 68 having a radius equal to the radius of the second terminal portion 40 of the cover 30.

As illustrated in FIG. 4, the terminal portion 40 seats within the semi-circular channel 60 and provides an attractive and minimally visible junction between the cover 30 and the body 50. The body 50 also includes a thin, relatively flexible terminal flange 72 which engages the rear door 16 and due to its thinness and flexibility provides a relatively secure windproof and waterproof seal thereagainst.

Adjacent the first slot 56 and extending upwardly and obliquely toward the rear window 22 (illustrated in FIG. 1) are a pair of upper and lower wiper lips or flanges 74. Preferably, the wiper flanges 74 include flocking 76 or other low friction surface treatment such as a low-friction coating or low-friction film which engages the rear window glass 22 and both minimizes the likelihood of squeaks or noise and wipes the window glass 22 as well as providing a physical seal between the upper portion of the door 16 and the window glass 22 as will be readily appreciated. The wiper flanges 74 thus prevent the ingress of water, moisture or foreign matter into the door interior and reduce the amount of noise transmitted to the interior of the vehicle 10.

The body 50 may be made from any inherently dimensionally stable thermoplastic material to meet dimensional stability and exterior motor vehicle requirements. In the preferred embodiment, the body 50 is made from material substantially identical to the cover 30 and may be molded or extruded. However, the body 50 may also be made from PA material, glass filled PA, and the like. Furthermore, the body 50 may be made of heat formable material or heat stretch formable material.

If desired, the wiper flanges 74 may be made of a distinct material, preferably a flexible elastomeric material such as rubber, ethylene-propylene-diene-monomer (EPDM), Santoprene® thermoplastic elastomer (TPE) and the like. Santoprene® is a registered trademark of Advanced Elastomer Systems, L. P., of Akron, Ohio.

It should be appreciated that the invention is not limited to a particular geometric configuration or shape of the cover 30 and the body 50. It is envisioned that the body 50 can be adapted to a variety of cross-sectional shapes so that the weatherstrip assemblies 24 and 26 can accommodate and be installed in a wide variety of door configurations and vehicle body styles.

Furthermore, the ends of the weatherstrip assemblies 24 and 26 may define various configurations such as a square (perpendicular) cut 82, a curve or radiused cut 84 or other irregular profile, all intended to match or complement adjacent features of the vehicle 10 such as the door or other weatherstrip components. As a first alternative, end caps (not illustrated) may be molded on one or both ends of the beltstrip or weatherstrip 26 in a separate molding process. Molded end caps can provide both distinct cross sections such as filled and sealed regions of the slots 56 and 64 as well as appropriately shaped or contoured end portions which again match or complement adjacent features of the vehicle body. As a second alternative, end caps may be integrally molded or formed with the cover 30.

It should also be appreciated that a two piece outer belt weatherstrip assembly 24 or 26 according to the present invention provides two specific advantages. The first relates to the adaptability and smoothness with which the beltstrip conforms to any body configuration such as the hip 28 or other curve or feature of the doors 14 and 16. The two piece construction minimizes the forces of tension and compression generated within the weatherstrip 26 as it is displaced from a linear configuration, thus facilitating a more accurate match between the weatherstrip 26 and the door panel 16. Secondly, because a weatherstrip 26 can be conformed more accurately to a vehicle shape, its appearance and the overall appearance of the vehicle 10 are improved.

The foregoing disclosure is the best mode devised by the inventors for practicing this invention. It is apparent, however, that products incorporating modifications and variations will be obvious to one skilled in the art of weatherstrip assemblies. Inasmuch as the foregoing disclosure presents the best mode contemplated by the inventors for carrying out the invention and is intended to enable any person skilled in the pertinent art to practice this invention, it should not be construed to be limited thereby but should be construed to include such aforementioned obvious variations and be limited only by the spirit and scope of the following claims.

We claim:

1. A two piece weatherstrip for a motor vehicle comprising, in combination,
    a cover including a first flange portion, a second flange portion and a centrally disposed web, said first and second flange portions defining an outer surface,
    a body including a first slot and an adjacent first face and an adjacent oppositely disposed second slot and an adjacent second face, said first slot adapted to receive a flange of said motor vehicle and said second slot receiving said web, at least one wiper flange extending from said first face, a flexible flange extending from said second face and having a terminal portion for engaging said motor vehicle and including a curved recess between said terminal portion and said second face, said curved recess receiving and engaging a complementary portion of one of said flange portions of said cover.

2. The two piece weatherstrip of claim 1 wherein said one of said flange portions defines a rounded end and said recess of said body is complementarily rounded.

3. The two piece weatherstrip of claim 1 further including flocking disposed on said at least one wiper flange.

4. The two piece weatherstrip of claim 1 including at least two wiper flanges.

5. The two piece weatherstrip of claim 1 wherein said body further includes an S-shaped metal insert.

6. The two piece weatherstrip of claim 1 wherein said body includes pluralities of obliquely disposed webs in said slots.

7. The two piece weatherstrip of claim 1 wherein said centrally disposed web of said cover includes an asymmetrical notch.

8. A two piece weatherstrip for a vehicle comprising, in combination,
    a cover including first and second flanges defining an outer surface and a centrally disposed web extending from said cover on a side opposite said outer surface, and
    a body including a pair of adjacent oppositely disposed slots, one of said slots receiving said web of said cover and another of said slots adapted to receive an edge of said vehicle, a third flange extending from said body adjacent said one of said slots and having a flexible terminal portion for engaging a portion of said vehicle, a recess formed in said third flange receiving a complementary portion of one of said flanges of said cover and a wiper extending from said body adjacent said another of said slots for engaging a window.

9. The two piece weatherstrip of claim 8 further including low-friction material on said wiper.

10. The two piece weatherstrip of claim 8 wherein said body further includes an S-shaped metal insert.

11. The two piece weatherstrip of claim 8 wherein one of said flanges defines a rounded end and said recess of said body is complementarily rounded to receive said radiused end.

12. The two piece weatherstrip of claim 8 wherein said body includes pluralities of obliquely disposed webs in said slots.

13. The two piece weatherstrip of claim 8 wherein said centrally disposed web of said cover includes an asymmetrical notch.

14. A two piece outer belt weatherstrip for a vehicle door comprising, in combination,
    a cover including first and second flanges defining an outer surface and a centrally disposed web, one of said first and said second flanges defining a curved end, and
    a body including an S-shaped metal channel and defining a first slot and a second adjacent, oppositely disposed slot, one of said slots receiving said centrally disposed web of said cover and another of said slots adapted to receive a flange of said vehicle, a wiper flange extending from said body adjacent said another of said slots, a vehicle engaging flange extending from said body adjacent said one of said slots and having a complementary recess receiving said curved end portion of said one of said first and second flanges.

15. The two piece outer belt weatherstrip of claim 14 further including flocking disposed on said at least one wiper flange.

16. The two piece outer belt weatherstrip of claim 14 wherein said body includes pluralities of obliquely disposed webs in said slots.

17. The two piece outer belt weatherstrip of claim 14 wherein said centrally disposed web of said cover includes an asymmetrical notch.

18. The two piece outer belt weatherstrip of claim 14 including at least two wiper flanges.

* * * * *

UNITED STATES PATENT AND TRADEMARK OFFICE
CERTIFICATE OF CORRECTION

PATENT NO. : 7,171,785 B1 Page 1 of 1
APPLICATION NO. : 09/717767
DATED : February 6, 2007
INVENTOR(S) : Walter J. Kelly et al.

It is certified that error appears in the above-identified patent and that said Letters Patent is hereby corrected as shown below:

<u>In the Claims</u>

Column 5, in claim 1, line 7, immediately after "an adjacent" insert --,-- (comma).

Column 6, in claim 8, line 7, immediately after "a pair of adjacent" insert --,-- (comma).

Signed and Sealed this

Twentieth Day of November, 2007

JON W. DUDAS
*Director of the United States Patent and Trademark Office*